US011789792B1

(12) United States Patent
Graham (10) Patent No.: US 11,789,792 B1
(45) Date of Patent: Oct. 17, 2023

(54) MESSAGE PASSING INTERFACE (MPI) COLLECTIVES USING MULTI-ALLGATHER

(71) Applicant: MELLANOX TECHNOLOGIES, LTD., Yokneam (IL)

(72) Inventor: Richard Leigh Graham, Knoxville, TN (US)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 21 days.

(21) Appl. No.: 17/825,085

(22) Filed: May 26, 2022

(51) Int. Cl.
G06F 9/54 (2006.01)
(52) U.S. Cl.
CPC .................................. G06F 9/546 (2013.01)
(58) Field of Classification Search
None
See application file for complete search history.

(56) References Cited

U.S. PATENT DOCUMENTS

| | | | |
|---|---|---|---|
| 10,284,383 B2 | 5/2019 | Bloch et al. | |
| 10,521,283 B2 | 12/2019 | Shuler et al. | |
| 11,088,916 B1* | 8/2021 | Chandrashekhar | ... H04L 41/122 |
| 11,252,027 B2 | 2/2022 | Ben-Moshe et al. | |
| 2007/0180083 A1 | 8/2007 | Adam et al. | |
| 2018/0324129 A1* | 11/2018 | Varadarajan | ............ H04L 47/50 |
| 2020/0106828 A1 | 4/2020 | Elias et al. | |
| 2020/0265043 A1 | 8/2020 | Graham et al. | |
| 2021/0224051 A1* | 7/2021 | Bequet | ................ G06F 9/45533 |
| 2023/0084918 A1* | 3/2023 | Wiegman | ................ G06F 21/32 |
| | | | 701/3 |

OTHER PUBLICATIONS

"MPI: A Message-Passing Interface Standard," University of Tennessee, Jun. 9, 2021, Version 4.0, 1139 pages.
Faraj et al. "Automatic Generation and Tuning of MPI Collective Communication Routines," ICS '05: Proceedings of the 19th annual international conference on Supercomputing, Jun. 2005, pp. 393-402.
Gropp et al. "The MPI Message-Passing Interface Standard: Overview and Status," Advances in Parallel Computing, 1995, vol. 10, pp. 265-269 (Abstract only).
Leiserson "Fat-trees: universal networks for hardware—efficient supercomputing," IEEE Transactions on Computers, Oct. 1985, vol. 34, pp. 892-901 (Abstract only).
Zheng et al. "Simulation of the performance and scalability of message passing interface (MPI) communications of atmospheric models running on exascale supercomputers," Geoscientific Model Development, Aug. 2018, vol. 11, No. 8, pp. 3409-3426.
Invitation to Pay Additional Fees for International (PCT) Patent Application No. PCT/IB22/00292, dated Aug. 30, 2022 2 pages.

* cited by examiner

*Primary Examiner* — Craig C Dorais
(74) *Attorney, Agent, or Firm* — SHERIDAN ROSS P.C.

(57) ABSTRACT

Systems, methods, and devices for performing computing operations are provided. In one example, a system is described to include an endpoint belonging to a collective that is organized as a hierarchical tree. The collective includes one or more application groups that are connected to leaf nodes of the hierarchical tree, where each application-level process in the one or more application groups initiate processing of data based on an order of arrival known for at least one other application-level process joining the one or more application groups.

20 Claims, 6 Drawing Sheets

MESSAGE PASSING INTERFACE (MPI) COLLECTIVES USING MULTI-ALLGATHER

FIELD OF THE DISCLOSURE

The present disclosure is generally directed toward networking and, in particular, toward advanced computing techniques employing distributed processes.

BACKGROUND

Distributed communication algorithms, such as collective operations, distribute work amongst a group of communication endpoints, such as processes. Collective operations face the challenge of having different endpoints (processes) entering the operation at different times, perhaps as the result of load imbalance in the compute portion of the application invoking these algorithms. Members of the collective participating in distributed algorithms may rely on receiving data from other members as a prerequisite for their work. As a result, a late arriving endpoint may delay progress of other members of the group.

BRIEF SUMMARY

Message Passing Interface (MPI) is a communication protocol that is used to exchange messages among processes in high-performance computing (HPC) systems. MPI, among other communication protocols, supports collective communication in accordance with a message-passing parallel programming model, in which data is moved from the address space of one process to that of another process through cooperative operations on each process in a process group. MPI provides point-to-point and collective operations that can be used by applications. These operations are associated with a defined object called a communicator. Communicators provide a mechanism to construct distinct communication spaces in which process groups can operate. Each process group is associated with a communicator and has a communicator identifier that is unique with respect to all processes inside the communicator. While embodiments of the present disclosure will be described with respect to MPI, it should be appreciated that MPI is one of many communication protocols that can be used to exchange data between distributed processes. Having all processes participating in a distributed algorithm be provided with a consistent view of group activity in the operation supports the use of adaptive algorithms.

Modern computing and storage infrastructure use distributed systems to increase scalability and performance. Common uses for such distributed systems include: datacenter applications, distributed storage systems, and HPC clusters running parallel applications While HPC and datacenter applications use different methods to implement distributed systems, both perform parallel computation on a large number of networked compute nodes with aggregation of partial results or from the nodes into a global result. Many datacenter applications such as search and query processing, deep learning, graph and stream processing typically follow a partition-aggregation pattern.

Typically, HPC systems contain thousands of nodes, each having tens of cores. It is common in MPI to bind each process to a core. When launching an MPI job, the user specifies the number of processes to allocate for the job. These processes are distributed among the different nodes in the system. The MPI standard defines blocking and non-blocking forms of barrier synchronization, broadcast, gather, scatter, gather-to-all, all-to-all gather/scatter, reduction, reduce-scatter, and scan. A single operation type, such as alltoall, may have several different variants, such as alltoall and alltoallv. These collective operations scatter or gather data from all members to all members of a process group. In the operation alltoall, each process in the communicator sends a fixed-size message to each of the other processes. The operation alltoallv is similar to the operation alltoall, but the messages may differ in size.

For those collective operations that are capable of accounting for the order in which members (e.g., endpoints, processes, or other network elements having computing resources) enter the collective and changing algorithm flow based on the order of arrival, having the ability to detect the order of arrival in an efficient manner provides the opportunity to improve the overall completion time for the collective. The ring algorithm used in some implementations of the MPI alltoallv is an example of an algorithm that under the right conditions may benefit from knowing the order of arrival. If the order of entry into the algorithm is used as an ordering parameter in the ring rather than the rank within the MPI communicator (the group), one can communicate with other ranks that have already joined the operation, rather than being blocked by trying to communicate with ranks yet to arrive.

Embodiments of the present disclosure aim to improve the overall efficiency and speed with which collective operations are performed by using order of arrival as an ordering parameter. Such an approach helps avoid the delay that would otherwise be associated with waiting for all members to join the collective.

Illustratively, and without limitation, a device is disclosed herein to include: one or more processing circuits that receive and process data as part of a collective that is organized as a hierarchical tree; one or more trigger circuits that initiate the one or more processing circuits to process the data based on an order of arrival known for at least one other application-level process joining an application group; and one or more sending circuits that send an output of the one or more processing circuits to an endpoint designated as a leaf node of the collective, where the output of the one or more processing circuits includes a result computed by the one or more processing circuits based on processing the data.

In some embodiments, the application group includes a number, N, of application-level processes assigned thereto, where N is greater than one, and where each of the N application-level processes are assigned to the application group based on their order of arrival to the collective.

In some embodiments, each of the N application-level processes begin processing respective data after N application-level processes have joined the application group and each of the N application-level processes do not wait for other application-level processes in other application groups to begin processing their respective data.

In some embodiments, the hierarchical tree includes a root node, a plurality of leaf nodes, and a plurality of vertex nodes provided between the root node and the plurality of leaf nodes.

In some embodiments, the leaf node that receives the output from the one or more sending circuits also receives a second output from another application-level process belonging to the application group.

In some embodiments, contributions of each application-level process belonging to the application group are independent of one another and do not require aggregation prior to being transmitted to the leaf node.

In some embodiments, the output is provided in a size that is specified based on an operation being performed by the collective.

In another example, a device is assigned to operate as a leaf node in a collective that is organized as a hierarchical tree, the device may include: one or more receive circuits that receive outputs from one or more application-level processes assigned to an application group, where the application group is also part of the collective; one or more aggregation circuits that aggregate the outputs from the application group until one of: (i) a predetermined amount of data has been aggregated; (ii) outputs from all application-level processes assigned to the application group have been received; and (iii) until a timer expires; and one or more sending circuits that transmit data aggregated by the one or more aggregation circuits to a parent node in the hierarchical tree after one of: (i) the predetermined amount of data has been aggregated; (ii) the outputs from all application-level processes assigned to the application group have been received; and (iii) until the timer expires.

In some embodiments, the parent node includes a vertex node and the vertex node concatenates the data received from the one or more sending circuits with data from at least one other leaf node in the hierarchical tree.

In some embodiments, the hierarchical tree includes a plurality of vertex nodes and a root node, where the root node receives data from the plurality of vertex nodes and transmits the data received from the plurality of vertex nodes to one or more destination endpoints.

In some embodiments, the timer is adjustable on a per-operation basis.

In some embodiments, the collective is formed to complete a collective operation.

In some embodiments, the one or more aggregation circuits concatenate the outputs from the application group.

In another example, a system is disclosed herein to include: an endpoint belonging to a collective that is organized as a hierarchical tree, where the collective further includes one or more application groups that are connected to leaf nodes of the hierarchical tree, where each application-level process in the one or more application groups initiate processing of data based on an order of arrival known for at least one other application-level process joining the one or more application groups.

In some embodiments, each endpoint in the collective follows a data exchange pattern.

In some embodiments, the one or more application groups include a first application group and a second application group, where a first leaf node of the hierarchical tree receives outputs from the first application group, where a second leaf node of the hierarchical tree receives outputs from the second application group, and where application-level processes of the first application group begin processing data before application-level processes of the second application group begin processing data.

In some embodiments, the application-level processes of the first application group join the collective prior to the application-level processes of the second application group.

In some embodiments, the hierarchical tree includes a root node, a plurality of leaf nodes, and a plurality of vertex nodes provided between the root node and the plurality of leaf nodes.

In some embodiments, contributions of each application-level process belonging to the one or more application groups are independent of one another and do not require aggregation prior to being transmitted to the leaf nodes.

In some embodiments, the leaf nodes aggregate outputs from the one or more application groups until a predetermined amount of data has been aggregated or until a timer expires.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for performing collective operations will be described in accordance with at least some embodiments of the present disclosure. While embodiments will be described in connection with particular operations (e.g., alltoall or alltoallv), it should be appreciated that the concepts and features described herein can be applied to any number of operations. Indeed, the features described herein should not be construed as being limited to the particular types of collective operations depicted and described.

While concepts will be described herein with respect to order and "order of arrival", it should be appreciated that the claims are not so limited. For example, embodiments of the present disclosure aim to guarantee, to the extent possible, that the data will be concatenated based on the order data arrives at a given concatenation unit. If the actual order of arrival is desired, a user or application will need to embed in the data being sent a time stamp (perhaps based on a global timer) and then sort the data when it receives the output. For many types of operations the real order of arrival may not be required, but simply knowing which network element has already arrived at a given point in time may be sufficient or preferred.

Figure 1:
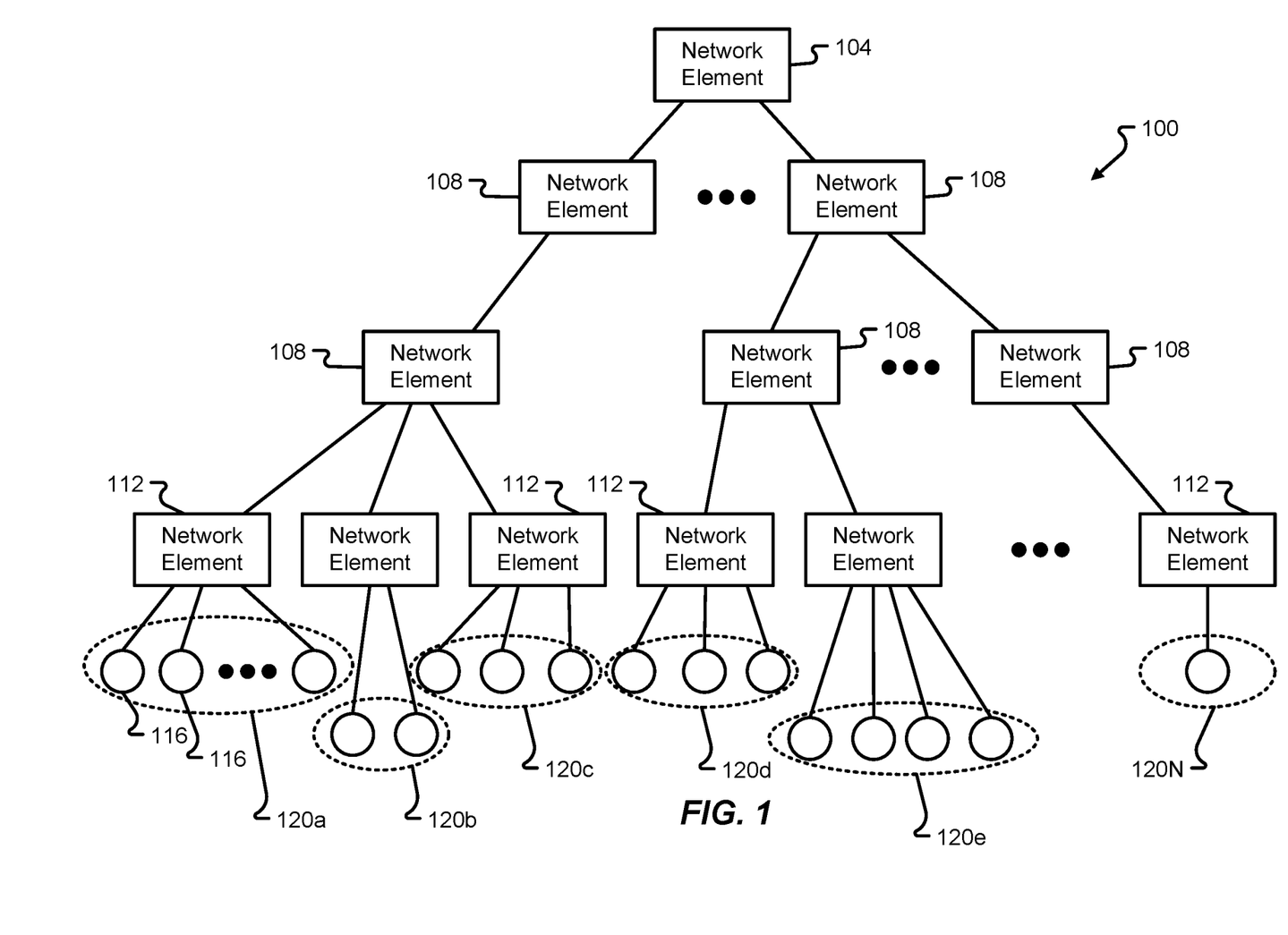
FIG. 1 is a block diagram illustrating a computing system in accordance with at least some embodiments of the present disclosure.

Referring initially to FIG. 1, an illustrative system 100 is shown in which members/processes are organized into a collective. The collective shown in FIG. 1 includes multiple network elements 104, 108, 112 as well as other devices 116 that all contribute computing resources to the collective.

The hierarchical tree may include a network element designated as a root node 104, one or more network elements designated as vertex nodes 108, one or more network elements designated as leaf nodes 112, and one or more network elements designated as application-level processes 116. It should be appreciated that the network elements designated as application-level processes 116 may correspond to devices that are similar or identical to the network elements designated as part of the hierarchical tree (e.g., providing root node 104, vertex nodes 108, or leaf nodes 112) except that the application-level processes 116 are asked to carry out different roles within the collective. The application-level processes 116 may also be referred to as threads or endpoints participating in the collective operation. One or more application-level processes 116 may contribute data (e.g., provide their outputs) to a single leaf node 112. In some embodiments, the collective organizes the application-level processes 116 into application groups 120, where each application group 120 may include one or more application-level processes 116.

The rest of the collective (e.g., nodes not belonging to the application group 120) may be organized in a tree-like structure. In some embodiments, the tree-like structure may include hierarchical data objects referred to herein as "SHARP reduction trees" or "SHARP trees" that describe available data reduction topologies and collective groups. The leaf nodes 112 of a SHARP tree represent the data sources, and the interior junctions (vertex nodes 108) represent aggregation nodes, with one of the vertex nodes being the root node 104.

While FIG. 1 illustrates up to N application groups 120a-N, it should be appreciated that the collective can be organized to include a single application group 120 without departing from the scope of the present disclosure. Furthermore, while the network elements 104, 108, 112 of the hierarchical tree are shown in a particular configuration, it should be appreciated that any number of different configurations can be utilized. For instance, the hierarchical tree may include a single root node 104 and no vertex nodes 108, meaning that the leaf nodes 112 are connected directly to the root node 104. As another example, the hierarchical tree may include a single node where the leaf node 112 is also the root node 104. It should also be appreciated that a leaf node 112 may be connected to one, two, three, four, . . . , or more application-level processes 116. The SHARP definition assumes a single contribution from each leaf node child, whereas embodiments of the present disclosure can assume a number greater than one. In some embodiments, each application-level process 116 may join an application group 120 and receive order of arrival information as other application-level processes 116 join the collective and are assigned to an application group 120. The order of arrival information may not necessarily include a timestamp or exact description of when the application-level processes 116 joined the collective (although it may). Instead, the order of arrival information may include a simplified representation of when processes have joined the collective (e.g., a true ordered list based on time of arrival or a status indicator showing whether a particular process has joined or not). The content of the message may be fully user defined. It may also be possible to guarantee that all members of the group will receive that data sent from all processes in the same order.

In some embodiments, contributions from each application group 120 (e.g., application-level processes 116 belonging to an application group 120) may be independent. Said another way, each application-level process 116 may be independent of other application-level processes 116 and do not require aggregation prior to transmitting their outputs to a leaf node 112. The collective may be organized to provide independent application-level processes 116 because order of arrival information is shared amongst members of the collective, or at least between application-level processes 116 belonging to a common application group 120. In some embodiments, each application-level process 116 may be expected (or required) to contribute a data element of the same size to a leaf node 112, where the size of the data element (e.g., output of the application-level process 116) is defined for each individual operation. The leaf nodes 112 of the hierarchical tree may be configured to fill in payload data, such as timestamp and the like. The behavior of the leaf nodes 112 may also be specified on a per-operation basis.

As will be described in further detail herein, at least some nodes of the hierarchical tree (e.g., leaf nodes 112) may be configured to accumulate data arriving at the node from an application group 120 until a completion criterion is reached. Non-limiting examples of completion criterion that may be used to trigger a leaf node 112 to finish aggregation and provide an output to a higher-level node in the hierarchical tree include: (i) a predetermined amount of data has been aggregated; (ii) outputs from all application-level processes 116 assigned to the application group 120 have been received; and (iii) until a timer expires. The predetermined amount of data may correspond to an upper limit on the size that a given transmission up the tree is allowed. In some embodiments, if the predetermined amount of data is smaller than the total number of outputs from all application-level processes 116, then condition (i) is satisfied before condition (ii) and the leaf node 112 will finish aggregation and provide an output upon satisfaction of condition (i). Alternatively, if the total number of outputs from all application-level processes 116 is less than the predetermined amount of data, then condition (ii) is satisfied before condition (i) and the leaf node 112 will finish aggregation and provide an output upon satisfaction of condition (ii). Alternatively, if the timer expires before either condition (i) or condition (ii) are reached, then the leaf node 112 will finish aggregation and provide an output upon satisfaction of condition (iii). It should be appreciated that at full completion, condition (i) may always be satisfied unless an error occurs, even if conditions (ii) and/or (iii) are satisfied several times in the process.

As data is aggregated and forwarded up the tree, the data will eventually reach the root node 104. The root node 104 may collect all of the data from the lower-level nodes in the hierarchical tree and then distribute a final output to one or more specified destinations. For instance, the root node 104 may be responsible for distributing data to one or more specified SHARP tree destinations per the SHARP specification. In some embodiments, data is delivered to a host in any number of ways. As one example, data is delivered to a next work request in a receive queue, per standard InfiniBand transport specifications. As another example, data is delivered to a predefined (e.g., defined at operation initialization) buffer, concatenating the data to that data which has already been delivered to the buffer. A counting completion queue entry may then be used to increment the completion count, with a sentinel set when the operation is fully complete.

Figure 2:
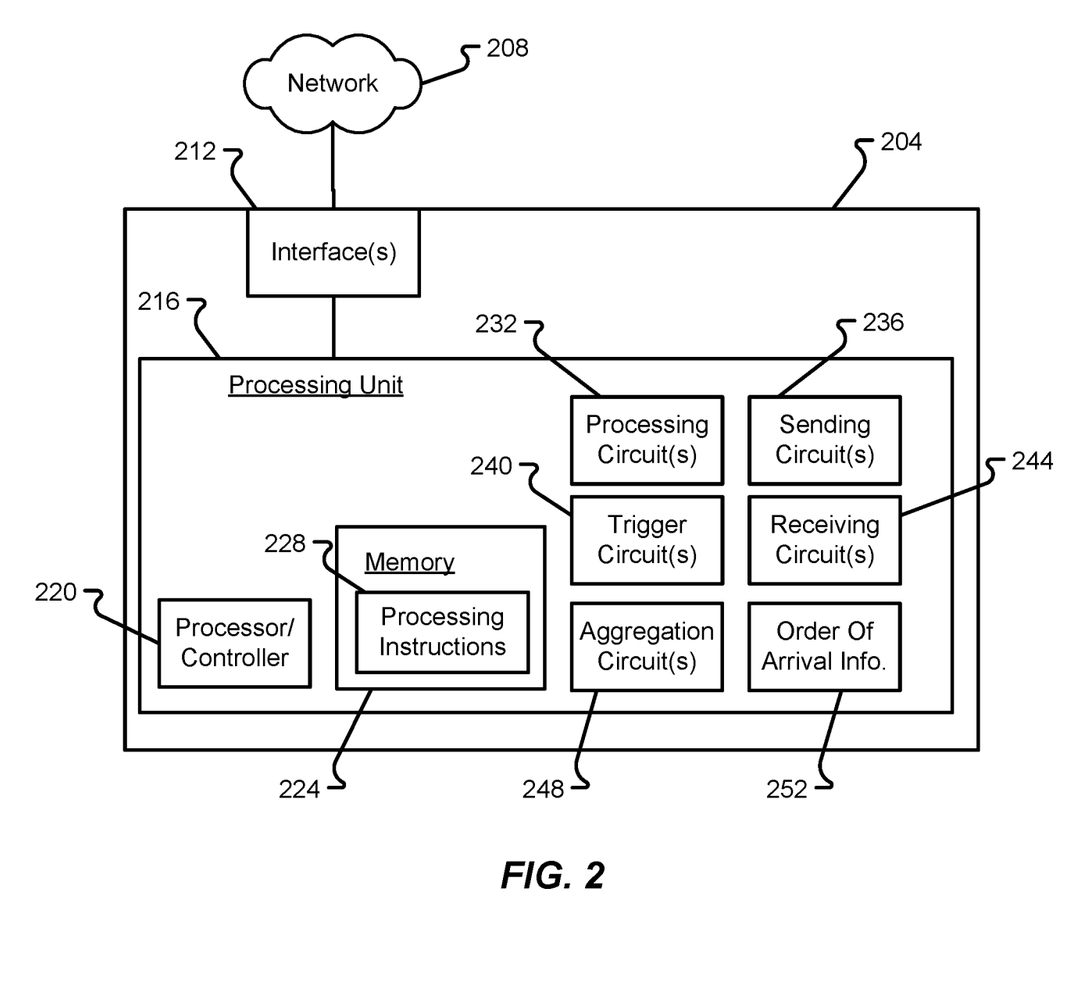
FIG. 2 is a block diagram illustrating a device eligible to join and operate as part of a collective in accordance with at least some embodiments of the present disclosure.

Referring now to FIG. 2, additional details of a device 204 that may be configured to contribute to the collective will be described in accordance with at least some embodiments of the present disclosure. The device 204 may correspond to a network element 104, 108, 112 or to a device that provides an application-level process 116 to an application group 120. Non-limiting examples of a device 204 include, without limitation, a switch, a server, a Network Interface Controller (NIC), an interface card, a Personal Computer (PC), a router, or the like. The device 204 is shown to be connected with a network 208 via a network interface 212. The device 204 is also shown to include a processing unit 216, which may include a processor 220, memory 224, and one or more circuits. The one or more circuits may be configured to perform functions in connection with executing a collective operation. Non-limiting examples of circuits that may be included in the device 104 are processing circuit(s) 232, sending circuit(s) 236, trigger circuit(s) 240, receiving circuit(s) 244, and aggregation circuit(s) 248. The processing unit 216 may also include order of arrival information for processes/members joining the collective. Although depicted as being retained outside of memory 224, it should be appreciated that the order of arrival information 252 may be stored inside memory 224 without departing from the scope of the present disclosure. The memory 224 is also shown to include processing instructions 228, which may facilitate similar behavior as the processing circuits 232 when executed by the processor 220.

The processing unit 216 may be configured to perform data processing functions for the device 204. As an example, the processing unit 216 in the form of a Central Processing Unit (CPU), Graphics Processing Unit (GPU), or Data Processing Unit (DPU), which may enable the device 204 to join a collective, communicate among members of the collective, process data according to the collective operation, etc.

The device interface 212 may connect with the communication network 208 via a communication link. The communication link may include a wired connection, a wireless connection, an electrical connection, etc. In some embodiments, the communication link may facilitate the transmission of data packets between the other devices connected to the network 208. Other members of a collective (e.g., network elements 104, 108, 112 or application-level processes 116) may also be connected to the network 208. It should be appreciated that the communication link established between the interface 212 and the network 208 may include, without limitation, a PCIe link, a Compute Express Link (CXL) link, a high-speed direct GPU-to-GPU link (e.g., an NVlink), etc.

The memory 224 may include instructions 228 for execution by the processor 220 that, when executed by the processor 220, enable the processing unit 216 to perform any number of tasks (e.g., data routing tasks, data processing tasks, data aggregation tasks, data sending tasks, etc.). Alternatively or additionally, the processing unit 216 may utilize the one or more circuits to implement functionality of device 204. In some embodiments, the processing circuit(s) 232 may be configured to receive and process data as part of the collective operation. Processes that may be performed by the processing circuit(s) 232 include, without limitation, arithmetic operations, data reformatting operations, Boolean operations, etc.

The sending circuit(s) 236 may be configured to send an output of the processing circuit(s) 232 to other members/processes of the collective. As an example, the processing circuits(s) 232 may generate one or more outputs that are transmitted via the interface 212 to a node of the hierarchical tree (e.g., network element 104, 108, 112). The sending circuit(s) 236 may be configured to format outputs of the processing circuit(s) 232 for transmission by the interface 212. The sending circuit(s) 236 may also be configured to operate or format data according to a communication protocol used within the network 208.

The trigger circuit(s) 240 may be configured to initiate operation of the processing circuit(s) 232. For instance, the trigger circuit(s) 240 may be configured to reference order of arrival information 252 and, based on the order of arrival information 252, provide a signal to the processing circuit(s) 232 that causes the processing circuit(s) 232 to begin processing data as part of the collective operation. Thus, the trigger circuit(s) 240 may be considered an initiator for the processing circuit(s) 232.

The receiving circuit(s) 244 may be similar to the sending circuit(s) 236 in that the receiving circuit(s) 244 may be configured to operate in connection with the interface 212. In some embodiments, the receiving circuit(s) 244 may be configured to receive output(s) (e.g., output data) from one or more nodes in a collective and format the output(s) for processing by the processing circuit(s) 232. In some embodiments, the receiving circuit(s) 244 may be configured to receive data from other nodes in the collective, which means the receiving circuit(s) 244 or more likely to be utilized by a leaf node 112, vertex node 108, or root node 104. It should also be appreciated, however, that an application-level process 116 may utilize the receiving circuit(s) 244 to receive data for processing.

The aggregation circuit(s) 248 may be configured to aggregate or concatenate data/outputs from lower-level nodes in the collective. For instance, if implemented by a leaf node 112, the aggregation circuit(s) 248 may aggregate outputs from application-level processes 116 of an application group 120. The aggregation circuit(s) 248 may aggregate data until instructed to release the aggregated data to a higher-level node in the collective. In some embodiments, the aggregation circuit(s) 248 may be configured to aggregate data from an application group 120 until a completion criterion is met, such as: (i) a predetermined amount of data has been aggregated; (ii) outputs from all application-level processes 116 assigned to the application group 120 have been received; or (iii) until a timer expires. The aggregation circuit(s) 248 may be used by the nodes of the hierarchical tree (e.g., the root node 104, vertex nodes 108, and leaf nodes 112). The aggregation circuit(s) 248 may not be as useful for use by an application-level process 116 since contributions of each application-level process 116 are independent of other application-level processes 116 and do not require aggregation prior to being transmitted to a leaf node 112.

As mentioned above, the order of arrival information 252 may include any suitable type of data, metadata, or the like that describes an order in which a process/member joined a collective. As mentioned above, the order of arrival information 252 may not necessarily include a timestamp or exact description of when the application-level processes 116 joined the collective (although it may). Instead, the order of arrival information 252 may include a simplified representation of when processes/members have joined the collective (e.g., a true ordered list based on time of arrival or a status indicator showing whether a particular process has joined or not). The order of arrival information 252 may be dynamically updated as additional processes/members join the collective.

The processor 220 and/or circuit(s) 144 may include one or more Integrated Circuit (IC) chips, microprocessors, circuit boards, simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 220 may correspond to an optional component of the processing unit 216, especially in instances where the circuit(s) provide sufficient functionality to support operations of the processing unit 216 described herein. As noted above, the processing unit 216 may correspond to a CPU, GPU, DPU, combinations thereof, and the like. Thus, while only a single processing unit 216 is shown in the device 204, it should be appreciated that the device 204 may include multiple processing units 216 without departing from the scope of the present disclosure.

The memory 224 may include any number of types of memory devices. As an example, the memory 224 may include Random Access Memory (RAM), Read Only Memory (ROM), flash memory, Electronically-Erasable Programmable ROM (EEPROM), Dynamic RAM (DRAM), buffer memory, combinations thereof, and the like.

Referring now to FIGS. 3-6, additional details regarding operations of components in the system 100 will be described. While certain steps of the methods will be described as being performed in a particular order and by a particular component, it should be appreciated that embodiments of the present disclosure are not so limited. Specifically, the order of operations in the various methods may be modified and any component or combination of components in the system 100 may be configured to perform some or all of the method steps depicted and described herein.

Figure 3:
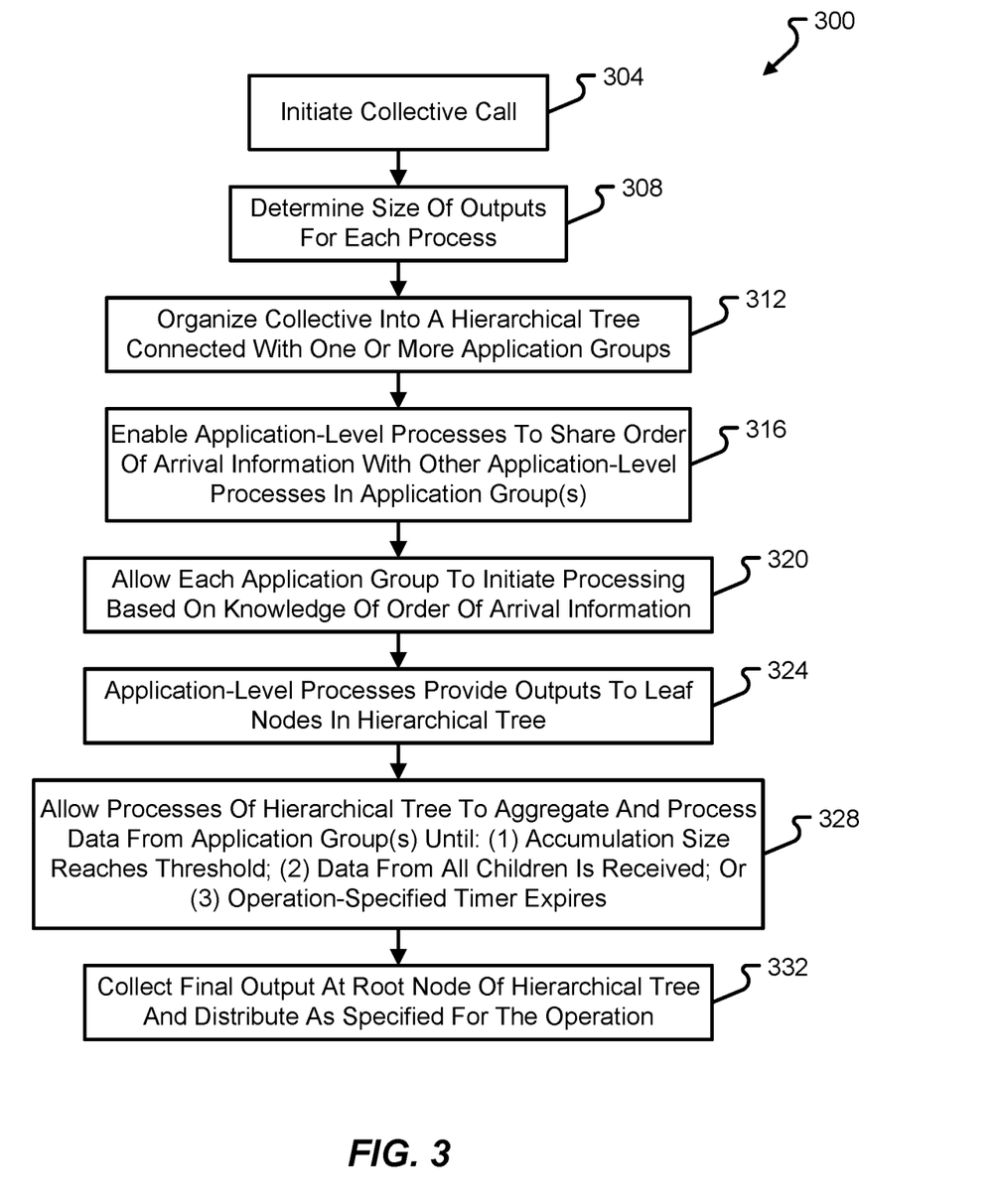
FIG. 3 is a flow diagram illustrating a method of executing a collective operation in accordance with at least some embodiments of the present disclosure.

Referring to FIG. 3, a method 300 of executing a collective operation will be described in accordance with at least some embodiments of the present disclosure. The method 300 begins by initiating a collective call (step 304). During the collective call, the application may determine or specify a size of data to be processed at and/or shared between processes of the collective. Said another way, the method 300 may include a step of determining a size of outputs for each process in the collective (step 308). During the collective call, the method 300 may also define an upper limit on the size of data that a given transmission up the tree can handle (e.g., define a maximum amount of data that can be transmitted from one process to another) and/or a timer value that will be used to determine if/when a particular node in the collective should stop aggregating data and provide data to a higher-level node. The thresholds, data sizes, and/or timer values may be operation or application-dependent, meaning that they may change from one operation/application to the next. As an example, the timer value may change or be adjustable on a per-operation basis.

The method 300 may continue by organizing the collective into a hierarchical tree connected with one or more application groups 120 (step 312). Once organized, the collective may enable application-level processes 116 to share order of arrival information with other application-level processes 116 (step 316). In some embodiments, order of arrival information may only be shared between application-level processes 116 of a common application group 120. In some embodiments, the application-level processes 116 may not necessarily know the order of arrival information for other application-level processes 116, but a coordinator of the collective may be aware of and track order of arrival information. In such a configuration, the coordinator of the collective may then use the order of arrival information to assign processes to application groups 120 and/or to initiate a particular application group 120 to begin processing data (step 320). As will be described in further detail herein, one application group 120 may begin processing data even though another application group 120 in the collective has not yet begun processing data, perhaps because not all application-level processes 116 have yet joined the application group 120.

As application groups 120 begin processing data, the application-level processes 116 of active application groups 120 may provide their outputs to leaf nodes 112 in the hierarchical tree (step 324). As mentioned above, each application-level process 116 may operate independent of other application-level processes 116. The method 300 may further continue by allowing nodes/processes of the hierarchical tree to aggregate and process data from application group(s) 120 until a completion criterion is met, such as: (i) a predetermined amount of data has been aggregated; (ii) outputs from all application-level processes 116 assigned to the application group 120 have been received; or (iii) until a timer expires (step 328).

The method 300 may then include collecting the final output(s) of nodes in the collective at the root node 104 (step 332). The root node 104 may then distribute a final output to one or more designated recipients of the output. The output of the root node 104 may be provided to a buffer, host, etc. The recipient of the output may be specified on a per-operation basis.

Figure 4:
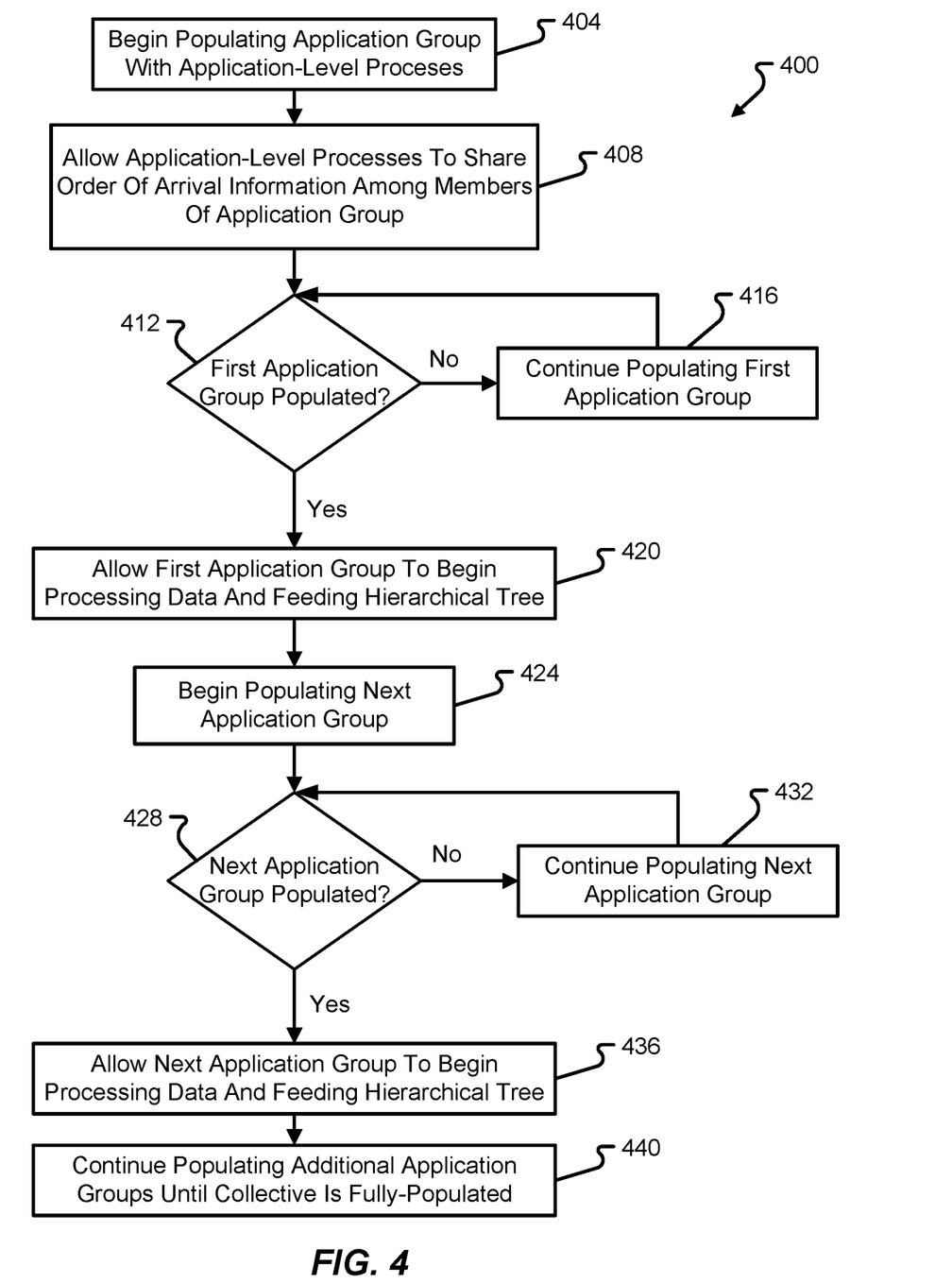
FIG. 4 is a flow diagram illustrating a method of populating and staging application groups in accordance with at least some embodiments of the present disclosure.

With reference now to FIG. 4, a method 400 of populating and staging application groups 120 will be described in accordance with at least some embodiments of the present disclosure. The method 400 begins by populating an application group 120 with one or more application-level processes 116 (step 404). The method 400 continues by allowing the application-level processes 116 to share order of arrival information (step 408). As mentioned above, the order of arrival information may be shared among the application-level processes 116 or may be shared with a centralized coordinator.

The method 400 then continues by determining if a first application group 120*a* is completely populated (step 412). If the query of step 412 is answered negatively, then the first application group continues to be populated with processes as they arrive (step 416) until such time as the first application group 120*a* is populated.

When the query of step 412 is answered positively, the method 400 continues by allowing the first application group 120*a* to begin processing data and feeding the hierarchical tree (e.g., feeding one or more leaf nodes 112 of the tree) (step 420). The method 400 then proceeds by populating the next application group (e.g., one or more of application groups 120*b*-N) (step 424). As application-level processes 116 are added to the next application group, the method 400 continues by determining if the next application group has been completely populated (step 428). If the query of step 428 is answered negatively, then the next application group continues to be populated with newly-arriving processes (step 432) until such time as the next application group is populated.

When the query of step 428 is answered positively, the method 400 continues by allowing the next application group to begin processing data and feeding the hierarchical tree (e.g., feeding one or more leaf nodes 112 of the tree) (step 436). The method 400 will then continue by populating any additional application groups (e.g., one or more of application groups 120*c*-N) until the collective is fully populated (step 440). The process of step 440 may be similar to the loop of steps 428, 432, and 436.

It should be appreciated that the application groups may be defined once, then used many times. Each time the group is used, the group may go through the process of discovering order of arrival, as order of arrival information may change from instance to instance. It may be possible to use an assumption that the groups are well defined, and all have the same view of who is in the group. Such an assumption may also apply to the coordination of an application group 120 as will be described with reference to FIG. 5.

Figure 5:
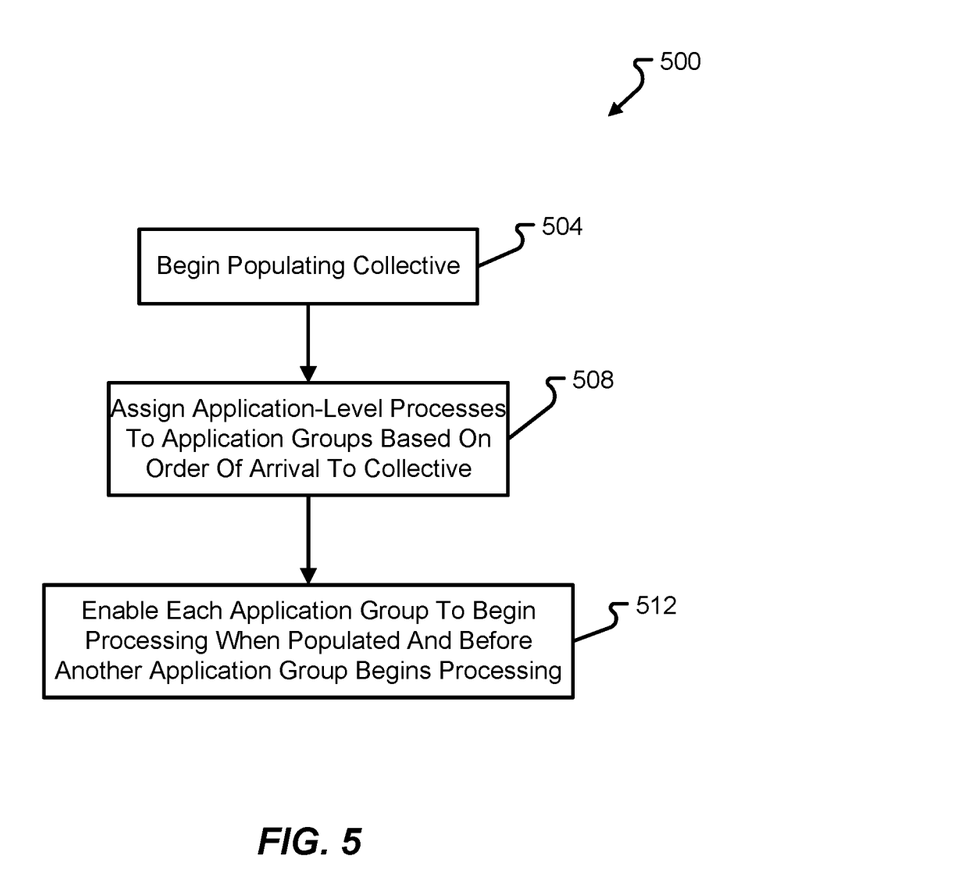
FIG. 5 is a flow diagram illustrating another a method of coordinating an application group in accordance with at least some embodiments of the present disclosure.

Referring now to FIG. 5, another a method 500 of coordinating an application group 120 will be described in accordance with at least some embodiments of the present disclosure. The method 500 initiates when a collective begins formation/population with one or more members/processes (step 504). Application-level processes 116 are assigned to application groups 120 based on their order of arrival to the collective (step 508). In some embodiments, each application group 120 is allowed to begin processing data as part of the collective operation when an application group 120 is fully populated, which may also occur before another application group 120 is fully populated (step 512). Thus, in some embodiments, one application group 120 may begin processing data while at least one other application group 120 is not processing data. As an application group 120 processes data, each application-level process 116 of the active application group 120 may provide output(s) to an appropriate leaf node 112. The leaf node 112 may then begin aggregating and outputting data to higher-level nodes even though another leaf node 112 has yet to receive data from another application group 120. This means that leaf nodes 112 of the hierarchical tree are not restrained by the collective missing at least one process.

Figure 6:
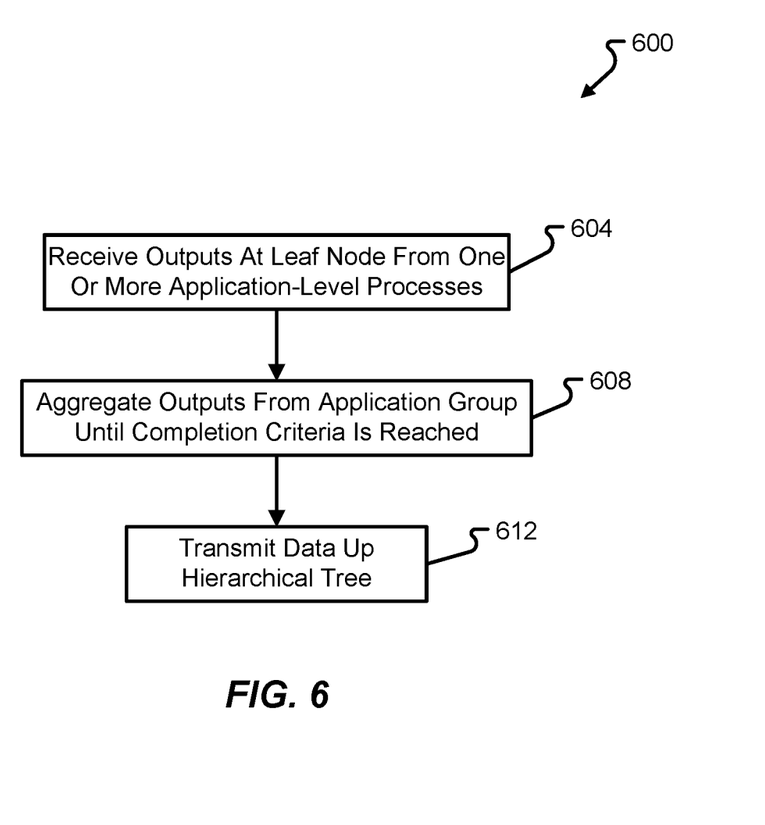
FIG. 6 is a flow diagram illustrating a method of processing data within a hierarchical tree in accordance with at least some embodiments of the present disclosure.

With reference to FIG. 6, a method 600 of processing data within a hierarchical tree will now be described in accordance with at least some embodiments of the present disclosure. The method 600 begins when output(s) of one or more application-level processes 116 are fed to a leaf node 112. The leaf node 112 receives the output(s) from the one or more application-level processes 116 and begins processing the data for the collective operation (step 604). As part of processing, the leaf node 112 may aggregate outputs from the application-level processes 116 of one or more application groups 120 until a completion criterion has been reached (step 608). Non-limiting examples of completion criterion include, without limitation, a predetermined amount of data has been aggregated, outputs from all application-level processes 116 assigned to the application group 120 have been received, a timer expires.

As data is processed, the data may be transmitted up the hierarchical tree until all data is received and a final output is ready (step 612). In some embodiments, the leaf node 112 provides its output to a vertex node 108. In some embodiments, the leaf node 112 provides its output to a root node 104. In some embodiments, the leaf node 112 is also the root node 104, in which case the leaf node 112 provides its output to a host.

While method 600 is described in connection with operations of a leaf node 112, it should be appreciated that a vertex node 108 may be configured to follow a similar operation as the leaf node 112 except that inputs to the vertex node 108 may correspond to outputs of leaf nodes 112. Likewise, outputs of the vertex node 108 may correspond to inputs of the root node 104.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A device, comprising:
one or more processing circuits that receive and process data as part of a collective that is organized as a hierarchical tree;
one or more trigger circuits that initiate the one or more processing circuits to process the data based on an order of arrival known for at least one other application-level process joining an application group; and
one or more sending circuits that send an output of the one or more processing circuits to an endpoint designated as a leaf node of the collective, wherein the output of the one or more processing circuits includes a result computed by the one or more processing circuits based on processing the data.

2. The device of claim 1, wherein the application group comprises a number, N, of application-level processes assigned thereto, wherein N is greater than one, and wherein each of the N application-level processes are assigned to the application group based on their order of arrival to the collective.

3. The device of claim 2, wherein each of the N application-level processes begin processing respective data after N application-level processes have joined the application group and wherein each of the N application-level processes do not wait for other application-level processes in other application groups to begin processing their respective data.

4. The device of claim 1, wherein the hierarchical tree comprises a root node, a plurality of leaf nodes, and a plurality of vertex nodes provided between the root node and the plurality of leaf nodes.

5. The device of claim 4, wherein the leaf node that receives the output from the one or more sending circuits also receives a second output from another application-level process belonging to the application group.

6. The device of claim 4, wherein contributions of each application-level process belonging to the application group are independent of one another and do not require aggregation prior to being transmitted to the leaf node.

7. The device of claim 1, wherein the output is provided in a size that is specified based on an operation being performed by the collective.

8. A device assigned to operate as a leaf node in a collective that is organized as a hierarchical tree, the device comprising:
one or more receive circuits that receive outputs from one or more application-level processes assigned to an application group, wherein the application group is also part of the collective;
one or more aggregation circuits that aggregate the outputs from the application group until one of: (i) a predetermined amount of data has been aggregated; (ii) outputs from all application-level processes assigned to the application group have been received; and (iii) until a timer expires; and
one or more sending circuits that transmit data aggregated by the one or more aggregation circuits to a parent node in the hierarchical tree after one of: (i) the predetermined amount of data has been aggregated; (ii) the outputs from all application-level processes assigned to the application group have been received; and (iii) until the timer expires.

9. The device of claim 8, wherein the parent node comprises a vertex node and wherein the vertex node concatenates the data received from the one or more sending circuits with data from at least one other leaf node in the hierarchical tree.

10. The device of claim 9, wherein the hierarchical tree comprises a plurality of vertex nodes and a root node, wherein the root node receives data from the plurality of vertex nodes and transmits the data received from the plurality of vertex nodes to one or more destination endpoints.

11. The device of claim 8, wherein the timer is adjustable on a per-operation basis.

12. The device of claim 8, wherein the collective is formed to complete a collective operation.

13. The device of claim 8, wherein the one or more aggregation circuits concatenate the outputs from the application group.

14. A system, comprising:
an endpoint belonging to a collective that is organized as a hierarchical tree, wherein the collective further comprises one or more application groups that are connected to leaf nodes of the hierarchical tree, wherein each application-level process in the one or more application groups initiate processing of data based on an order of arrival known for at least one other application-level process joining the one or more application groups.

15. The system of claim 14, wherein each endpoint in the collective follows a data exchange pattern.

16. The system of claim 14, wherein the one or more application groups comprise a first application group and a second application group, wherein a first leaf node of the hierarchical tree receives outputs from the first application group, wherein a second leaf node of the hierarchical tree receives outputs from the second application group, and wherein application-level processes of the first application group begin processing data before application-level processes of the second application group begin processing data.

17. The system of claim 16, wherein the application-level processes of the first application group join the collective prior to the application-level processes of the second application group.

18. The system of claim 14, wherein the hierarchical tree comprises a root node, a plurality of leaf nodes, and a plurality of vertex nodes provided between the root node and the plurality of leaf nodes.

19. The system of claim 14, wherein contributions of each application-level process belonging to the one or more application groups are independent of one another and do not require aggregation prior to being transmitted to the leaf nodes.

20. The system of claim 14, wherein the leaf nodes aggregate outputs from the one or more application groups until a predetermined amount of data has been aggregated or until a timer expires.

* * * * *